US010664160B2

(12) United States Patent
Lou et al.

(10) Patent No.: US 10,664,160 B2
(45) Date of Patent: May 26, 2020

(54) METHOD AND APPARATUS FOR IMPLEMENTING ACCESSIBILITY FUNCTION IN APPLICATIONS

(71) Applicant: Alibaba Group Holding Limited, George Town (KY)

(72) Inventors: Yong Lou, Hangzhou (CN); Jiajia Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/378,124

(22) Filed: Apr. 8, 2019

(65) Prior Publication Data

US 2019/0235753 A1    Aug. 1, 2019

Related U.S. Application Data

(63) Continuation of application No. PCT/CN2017/103379, filed on Sep. 26, 2017.

(30) Foreign Application Priority Data

Oct. 8, 2016  (CN) .......................... 2016 1 0878439

(51) Int. Cl.
*G06F 3/0488* (2013.01)
*G06F 3/16* (2006.01)
(Continued)

(52) U.S. Cl.
CPC .......... *G06F 3/04886* (2013.01); *G06F 3/167* (2013.01); *G06F 21/6245* (2013.01);
(Continued)

(58) Field of Classification Search
CPC ..... G06F 3/167; G06F 3/04886; H04L 67/20; H04L 67/2804
See application file for complete search history.

(56) References Cited

U.S. PATENT DOCUMENTS 9,323,518 B1    4/2016  Savant et al.
2013/0212478 A1  8/2013  Karr
(Continued)

FOREIGN PATENT DOCUMENTS

CN    103106031    5/2013
CN    104144239    11/2014
(Continued)

OTHER PUBLICATIONS

International Search Report and Written Opinion issued in International Application No. PCT/CN2017/103379 dated Dec. 25, 2017, 14 pages (with English translation).
(Continued)

*Primary Examiner* — Charles E Anya
(74) *Attorney, Agent, or Firm* — Fish & Richardson P.C.

(57) ABSTRACT

The present application discloses methods and apparatuses for implementing an accessibility function in applications. One example method includes receiving, by an application, a request for invoking an input control unit, where the input control unit is then invoked. A determination is made as to whether an event corresponding to an accessibility function is triggered by using the input control unit, and, in response to determining that the event corresponding to the accessibility function is triggered by using the input control unit, a service feedback instruction corresponding to the event is determined. An accessibility function engine of a device that comprises the application is invoked, and the accessibility function is implemented.

20 Claims, 4 Drawing Sheets

(51) Int. Cl.
*H04L 29/08* (2006.01)
*G06F 21/62* (2013.01)

(52) U.S. Cl.
CPC ...... *G06F 21/6281* (2013.01); *H04L 67/2804* (2013.01); *H04L 67/20* (2013.01)

(56) References Cited

U.S. PATENT DOCUMENTS

| | | | |
|---|---|---|---|
| 2013/0229377 A1* | 9/2013 | Fleizach | G06F 1/1632 345/173 |
| 2013/0268858 A1 | 10/2013 | Kim et al. | |
| 2015/0339049 A1 | 11/2015 | Kasemset et al. | |
| 2016/0077793 A1* | 3/2016 | Disano | G06F 3/167 715/728 |

FOREIGN PATENT DOCUMENTS

| | | |
|---|---|---|
| CN | 204422993 | 6/2015 |
| CN | 105023086 | 11/2015 |
| CN | 106886721 | 6/2017 |
| WO | WO 2015043399 | 4/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Application No. 17857819.1, dated Sep. 2, 2019, 6 pages.

* cited by examiner

METHOD AND APPARATUS FOR IMPLEMENTING ACCESSIBILITY FUNCTION IN APPLICATIONS

CROSS-REFERENCE TO RELATED APPLICATIONS

This application is a continuation of PCT Application No. PCT/CN2017/103379, filed on Sep. 26, 2017, which claims priority to Chinese Patent Application No. 201610878439.3, filed on Oct. 8, 2016, and each application is hereby incorporated by reference in its entirety.

TECHNICAL FIELD

The present application relates to the field of computer technologies, and in particular, to a method and an apparatus for implementing an accessibility function in applications.

BACKGROUND

Currently, to make a device such as a mobile phone or a computer accessible to a user, the system provides the user with many accessibility functions. For example, a text-to-speech function enables a visually impaired user to better interact with the device.

In the existing technology, a specific method for implementing an accessibility function in applications is shown in FIG. 1.

Step 101: A user sends a request for invoking an input control unit to application A installed in a device; after receiving the invocation request, application A invokes the input control unit configured in a system; and when the user triggers an event corresponding to an accessibility function by performing an operation on the input control unit, the input control unit sends the event to a system accessibility manager.

Step 102: After receiving the event, the system accessibility manager determines an accessibility service corresponding to a type of the event based on configuration of each accessibility service in the system, and sends the event to the accessibility service.

Step 103: After receiving the event, the accessibility service determines a service feedback instruction corresponding to the event, invokes an accessibility function engine on the device, and finally implements the accessibility function by using the accessibility function engine based on the service feedback instruction.

In actual applications, the accessibility service in the system is usually provided by third-party application software. It can be seen from step 102 that the third-party application software that provides the accessibility service can obtain operation information of the user and information in a device interface, and can also obtain privacy information of the user on application A. For example, in the previous step, the privacy information is an account and a password that are of the user on application A. As such, a threat is posed to information security of the user.

Currently, there are two methods for alleviating the previous problem: In one method, reliable third-party application software that provides an accessibility service is selected in advance. Apparently, this method cannot completely eliminate security risks brought by the third-party application software to user information. In the other method, the system prohibits enabling of an accessibility service, so information of a user does not need to pass through third-party application software. This method can completely eliminate security risks caused by the third-party application software to the user information, but the user cannot obtain the accessibility service when the method is used. As such, currently, there is no method that can not only secure user information, but also ensure that the user obtains the accessibility service.

SUMMARY

Implementations of the present application provide a method and an apparatus for implementing an accessibility function in applications, to alleviate a problem in the existing technology that security risks are caused to user information when third-party application software provides an accessibility function for a user.

The present disclosure provides a method for implementing an accessibility function in applications, where the method includes the following: receiving, by an application, a request for invoking an input control unit, and invoking the input control unit; when detecting an event corresponding to an accessibility function and triggered by using the input control unit, determining a service feedback instruction corresponding to the event; and invoking an accessibility function engine of a device that includes the application, and implementing the accessibility function by using the accessibility function engine based on the service feedback instruction.

Correspondingly, the present disclosure further provides an apparatus for implementing an accessibility function in applications, where the apparatus includes the following: a receiving unit, a determining unit, and an implementing unit, where the receiving unit receives a request for invoking an input control unit, and invokes the input control unit; when detecting an event corresponding to an accessibility function and triggered by using the input control unit, the determining unit determines a service feedback instruction corresponding to the event; and the implementing unit invokes an accessibility function engine of a device that includes the application, and implements the accessibility function by using the accessibility function engine based on the service feedback instruction.

According to the methods for implementing an accessibility function in applications provided in the present application, when detecting the event corresponding to the accessibility function and triggered by the input control unit, the application directly invokes the accessibility function engine of the device that includes the application based on the service feedback instruction corresponding to the event, to implement the accessibility function. That is, in a process of implementing an accessibility service in the present application, third-party application software does not need to be used. It alleviates a problem that security risks are caused to user information when the third-party application software obtains operation information of a user in the application and information in a device interface.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

Currently, in actual applications, in order to facilitate better interaction between a user and a device (for example, a mobile phone or a tablet computer), the device provides some accessibility functions for the user. For example, a "Talk Back" application in an Android system can provide a text-to-speech function for the user. This function enables a relatively weak-sighted user to correct an input error of the user on the mobile phone in time and facilitates the user.

The technical solutions provided in the present application are also applicable to a text-to-speech function in a mobile phone. To clearly describe the present application, the following uses the text-to-speech function as an example to describe a process that a user uses the text-to-speech function in a mobile phone application in the existing technology.

First, the user taps an input box in the current interface of application A, and an on-screen keyboard (that is, a native keyboard) configured in the operating system is displayed in the current interface of application A. Then, the user enters information in the input box by using the on-screen keyboard. Finally, text-to-speech is performed on the input information in real time based on the information entered by the user in the input box. For example, each time the user taps a key on the on-screen keyboard, the mobile phone performs text-to-speech on information corresponding to the key.

Figure 1:
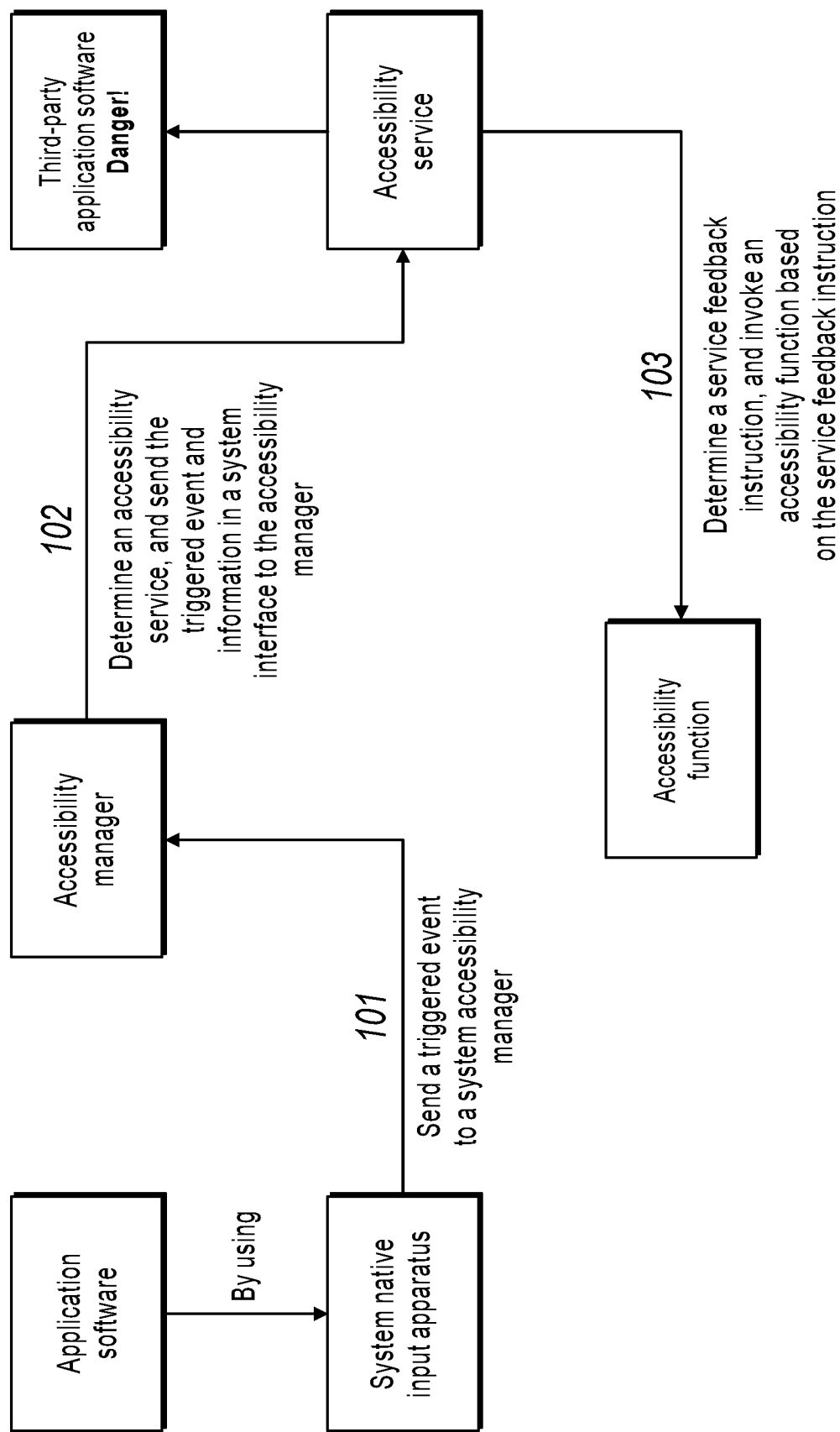
FIG. 1 is a specific schematic flowchart illustrating a method for implementing an accessibility function in applications in the existing technology.

In the previous step, after the user enters information in the input box by using the on-screen keyboard, an event corresponding to the text-to-speech function in the mobile phone is triggered. In this case, the on-screen keyboard first sends the event to an accessibility manager (as described in step 101 in FIG. 1). Then, the accessibility manager sends the event to an accessibility service corresponding to the event (as described in step 102 in FIG. 1). Next, the accessibility service determines a service feedback instruction corresponding to the event, and invokes a text-to-speech engine. Finally, the text-to-speech function is implemented by using the text-to-speech engine based on the service feedback instruction (as described in step 103 in FIG. 1).

As described in the background, the accessibility service is usually provided by third-party application software. In the previous process of implementing text-to-speech, the third-party application software can obtain privacy information of the user on application A, causing security risks to the information of the user.

To alleviate the previous problem, the present application provides a method and an apparatus for implementing an accessibility function in applications. To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. Other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 2:
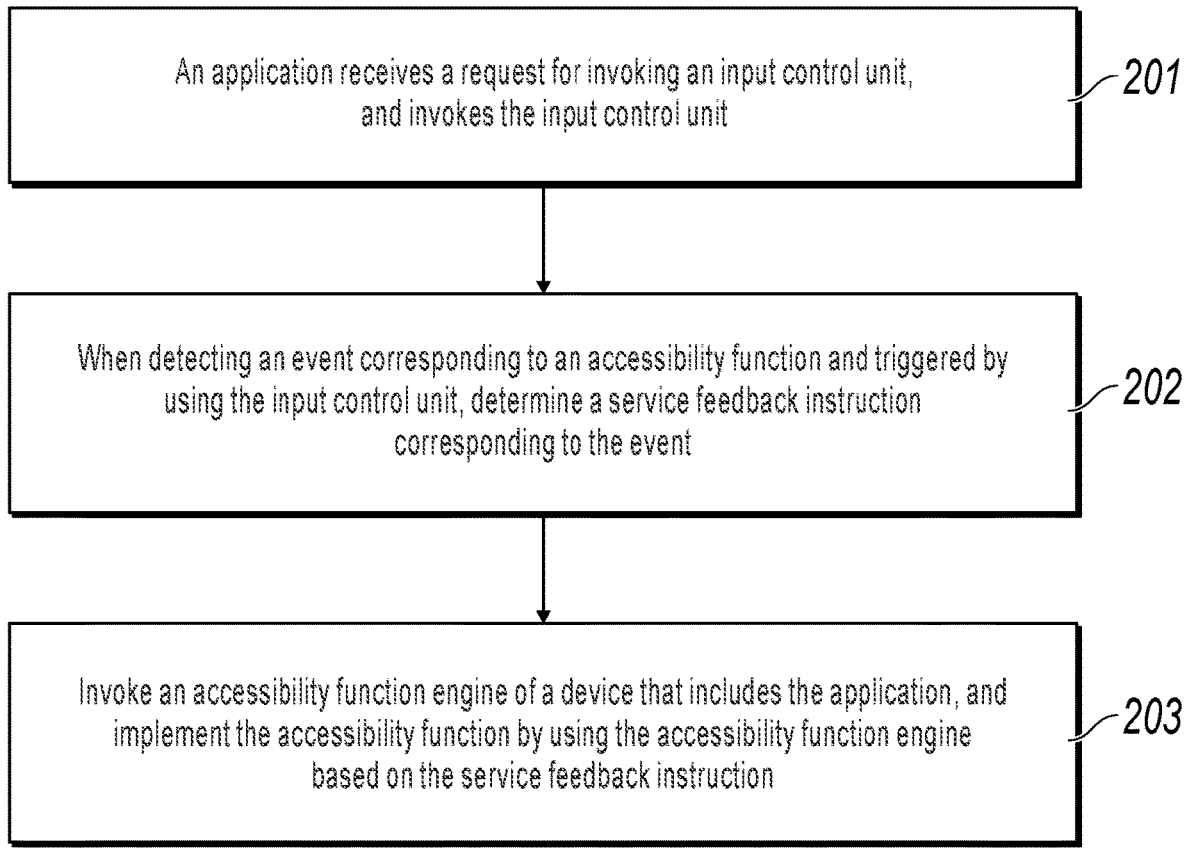
FIG. 2 is a specific schematic flowchart illustrating a method for implementing an accessibility function in applications, according to an implementation of the present application.

The present application provides a method for implementing an accessibility function in applications, to alleviate a problem in the existing technology that security risks are caused to user information when third-party application software provides an accessibility function for a user. FIG. 2 shows a schematic flowchart of the method. The method includes the following steps.

Step 201: An application receives a request for invoking an input control unit, and invokes the input control unit.

In the present step, the application receives the request for invoking the input control unit, where the request for invoking the input control unit can be triggered by that "the user taps an input box in the current application interface" in the previous example, or can be triggered by other predetermined operations.

After receiving the request for invoking the input control unit, the application displays the input control unit in the current application interface. The input control unit can be an on-screen keyboard. The input control unit can be an on-screen keyboard interface including some on-screen keys. The input control unit can also be another input control unit, and the input control unit can be configured in an operating system or can be preconfigured by the application. Implementations are not specifically limited here.

Step 202: When detecting an event corresponding to an accessibility function and triggered by using the input control unit, determine a service feedback instruction corresponding to the event.

After invoking the input control unit, the application detects an event corresponding to the accessibility function and triggered by using the input control unit. There are many detection methods. For example, the application can detect an event triggered by using the input control unit, determine a type of the triggered event, and determine whether the triggered event is an event corresponding to the accessibility function based on the type of the triggered type.

For example, event types corresponding to a predetermined accessibility function are "tap", "double tap", and "focus change". If the user "taps" an object on an input control unit, the application detects that the type of the triggered event is an event type corresponding to the accessibility function, that is, the triggered event is an event corresponding to the accessibility function. If the user "drags" an object in the application interface, the application detects that the triggered event is not of an event type corresponding to the accessibility function, that is, the triggered event is not an event corresponding to the accessibility function.

The previous method for detecting an event corresponding to an accessibility function by the application can further be the following: detecting an event triggered by using the input control unit, determining an operation object of the user in the triggered event, and determining whether the triggered event is an event corresponding to the accessibility function based on the operation object.

For example, if the input control unit is an on-screen keyboard, and operation objects corresponding to a predetermined accessibility function are "a", "b", and "c" on the on-screen keyboard, and if the user taps "a" on the on-screen keyboard, the application detects that the operation object of the triggered event is an operation object corresponding to the accessibility function, that is, the triggered event is an event corresponding to the accessibility function.

The previous two examples of methods for detecting an event corresponding to an accessibility function are merely for illustrative description. In actual applications, a detection method can be set by a user based on the user's demands. Implementations are not specifically limited here.

When detecting the event corresponding to the accessibility function and triggered by the input control unit, the application determines the service feedback instruction corresponding to the event. The method for determining the service feedback instruction can be determining a service feedback instruction corresponding to a type of the event based on a predetermined mapping relationship between a type of an event corresponding to the accessibility function and each service feedback instruction.

Referring back to the previous example, event types corresponding to a predetermined accessibility function are "tap", "double tap", and "focus change". A mapping relationship between each service feedback instruction and each of the three event types is established. For example, if the accessibility function is a text-to-speech function, a mapping relationship can be established between a type "tap" and a service feedback instruction "performing text-to-speech on a tapped object". When a user "taps" an object in an application interface, the application determines that the service feedback instruction corresponding to the triggered event is "performing text-to-speech on a tapped object" based on the type of the triggered event and the previous mapping relationship.

The type of the event corresponding to the accessibility function and the service feedback instruction are merely for illustrative description. In actual applications, the type of the event corresponding to the accessibility function and the service feedback instruction are sometimes more complex. For example, the service feedback instruction can further limit an operation object. Assume that text-to-speech is performed only when a user taps "W", or when a user taps "W", text-to-speech volume is higher than that generated when another letter is tapped. These can be set based on the user's demands.

When the application detects that the event triggered by using the input control unit is not an event corresponding to the accessibility function, to save resources, the application may not need to perform an operation on the triggered event, that is, the application only needs to "pay attention" to an event type corresponding to the accessibility function.

Step 203: Invoke an accessibility function engine of a device that includes the application, and implement the accessibility function by using the accessibility function engine based on the service feedback instruction.

In the present step, the accessibility function engine of the device that includes the application is invoked. A specific invocation method can be as follows: The application first establishes a connection relationship to an engine that provides the accessibility function; after successfully establishing the connection relationship, the application can invoke the accessibility function engine; otherwise, the application cannot invoke the accessibility function engine.

A specific method for establishing the connection relationship to the accessibility function engine by the application is as follows: The application sends a request for invoking an interface to the accessibility function engine, and after the accessibility function engine receives the request, the application successfully invokes the interface of the accessibility function engine, that is, the application successfully establishes the connection relationship to the accessibility function engine.

In actual applications, interfaces of some accessibility function engines are open, that is, the accessibility function engine allows an application to invoke an interface as long as the application sends a request for invoking the interface. Some accessibility function engines set permission on objects that invoke interfaces. When an application sends a request for invoking an interface to the accessibility function engine, first, the accessibility function engine needs to verify whether the application has the permission to invoke the interface. After the verification succeeds, the application is allowed to invoke the interface.

The step of establishing the connection relationship to the accessibility function engine by the application can be performed before the application invokes the accessibility function engine. For example, the application can establish the connection relationship after invoking the input control unit or can establish the connection relationship after determining the service feedback instruction that corresponds to the triggered event.

If the connection relationship is established after the application invokes the input control unit, a specific process of establishing the connection relationship can be as follows: After invoking the input control unit, the application sends a connection request to the accessibility function engine; if the connection is successfully established, the application performs step 202; if the connection fails to be established, the application does not need to perform step 202. Compared with a method that the connection relationship is established after the application determines the service feedback instruction that corresponds to the triggered event, the connection method can reduce resource consumption.

After the application invokes the accessibility function engine, the accessibility function engine implements the accessibility function based on the service feedback instruction determined in step 202.

For example, Table 1 is a predetermined mapping relationship between an event type and each service feedback instruction.

TABLE 1

| Event type | Service feedback instruction |
|---|---|
| Tap | Performing text-to-speech on a tapped object |
| Double tap | Broadcasting a specific voice |
| . . . | |

If the user "taps" an object on the input control unit, the application determines that a service feedback instruction corresponding to the triggered event is "performing text-to-speech on a tapped object". In this case, the application invokes a text-to-speech engine of the device that includes the application, and the text-to-speech engine performs text-to-speech on the object tapped by the user based on the service feedback instruction "performing text-to-speech on a tapped object". When the user determines that the tapped object is an object that the user wants to enter, the user can "double-tap" the object to indicate that the object is selected as an input object, and the application determines that the service feedback instruction corresponding to the triggered event is "broadcasting a specific voice". For example, the predetermined specific voice is "jingling". In this case, after the user double-taps the object, the text-to-speech engine broadcasts a "jingling" sound.

It can be seen from content of the background that, in the method for implementing an accessibility function in applications in the existing technology, when an application detects an event corresponding to an accessibility function and triggered by an input control unit, the input control unit first sends the event to a system accessibility manager, then the system accessibility manager sends the event and information in an interface to third-party application software, and finally the accessibility function is implemented by invoking an accessibility function engine by using the third-party application software. In the present application, when detecting an event corresponding to the accessibility function and triggered by the input control unit, the application directly invokes an accessibility function engine of the device that includes the application based on a service feedback instruction corresponding to the event, to implement the accessibility function. That is, in the present application, an operating system including a system accessibility manager and an accessibility service can be directly bypassed in a process of implementing an accessibility service, that is, the third-party application software is bypassed, and the accessibility function engine is directly invoked to implement the accessibility function. It alleviates a problem that the third-party application software causes security risks to user information after obtaining operation information of the user in the application and information in a device interface.

It is worthwhile to note that, in step 202 and/or step 203 can be executed by an input control unit or another execution module in the application. Implementations are not limited in the present application.

As recorded in the previous content, the input control unit can be configured in the operating system or can be preconfigured by the application.

When the input control unit is configured in the operating system, in the present application, the operating system can be improved. An input control unit configured in an operating system in the existing technology needs to send an event corresponding to an accessibility function to an accessibility manager. However, an input control unit configured in the improved operating system in the present application intercepts an event corresponding to the accessibility function, and directly invokes the accessibility function engine of the device to implement the accessibility function. In a process of implementing the accessibility function, third-party application software does not need to be used. As such, security of user information is improved.

When the input control unit is configured by the application, after the user sends a request for invoking the input control unit to the application, the application shields an input control unit configured in the operating system, and displays the input control unit configured by the application in an application interface. When the user triggers an event corresponding to the accessibility function by using the input control unit configured by the application, the input control unit configured by the application directly invokes the accessibility function engine of the device to implement the accessibility function. Likewise, in a process of implementing the accessibility function, third-party application software does not need to be used. As such, security of user information is improved.

Figure 3:
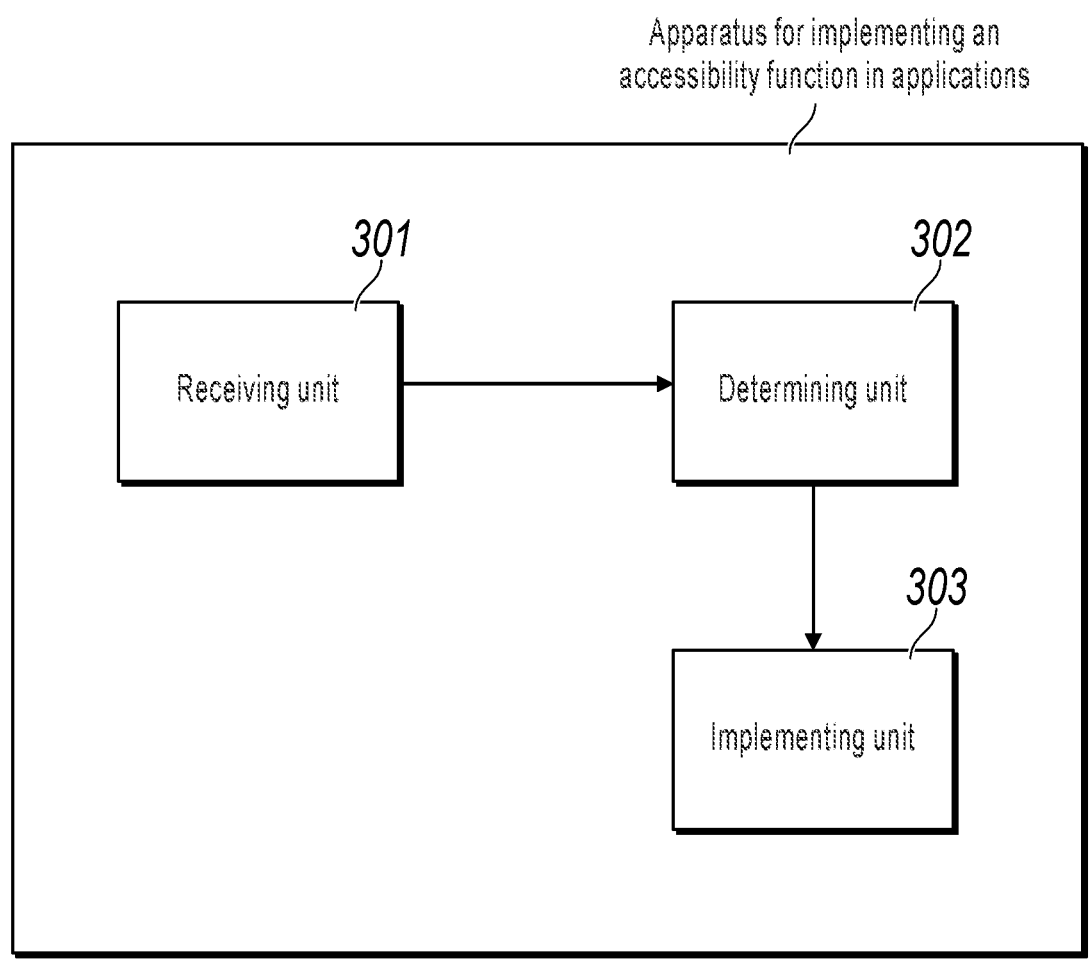
FIG. 3 is a specific schematic structural diagram illustrating an apparatus for implementing an accessibility function in applications, according to an implementation of the present application.

Correspondingly, the present disclosure further provides an apparatus for implementing an accessibility function in applications, to alleviate a problem in the existing technology that security risks are caused to user information when third-party application software provides an accessibility function for a user. FIG. 3 shows a schematic structural diagram of the apparatus. The apparatus includes the following: a receiving unit 301, a determining unit 302, and an implementing unit 303.

The receiving unit 301 receives a request for invoking an input control unit, and invokes the input control unit.

When detecting an event corresponding to an accessibility function and triggered by using the input control unit, the determining unit 302 determines a service feedback instruction corresponding to the event.

The implementing unit 303 invokes an accessibility function engine of a device that includes the application, and implements the accessibility function by using the accessibility function engine based on the service feedback instruction.

A working procedure of this apparatus implementation is as follows: First, the receiving unit 301 receives the request for invoking the input control unit, and invokes the input control unit. Then, when detecting the event corresponding to the accessibility function and triggered by using the input control unit, the determining unit 302 determines the service feedback instruction corresponding to the event. Finally, the implementing unit 303 invokes the accessibility function engine of the device that includes the application, and implements the accessibility function by using the accessibility function engine based on the service feedback instruction.

There are many methods for implementing an accessibility function in applications in the previous apparatus implementation. For example, in an implementation, the determining unit 302 detects an event corresponding to an accessibility function and triggered by using the input control unit, including the following: detecting an event triggered by using the input control unit; determining a type of the triggered event; and determining whether the triggered event is an event corresponding to the accessibility function based on the type.

In another implementation, the determining unit 302 determines a service feedback instruction corresponding to the event, includes the following: determining a service feedback instruction corresponding to a type of the event based on a predetermined mapping relationship between a type of an event corresponding to the accessibility function and each service feedback instruction.

In still another implementation, the implementing unit 303 invokes an accessibility function engine of a device that includes the application, including the following: establishing a connection relationship to an engine that provides the accessibility function; and invoking the accessibility function engine of the device that includes the application based on the connection relationship.

In yet another implementation, the determining unit 302 detects an event corresponding to an accessibility function and triggered by using the input control unit, including the following: detecting an event corresponding to the accessibility function by using the input control unit.

The determining unit 302 determines a service feedback instruction corresponding to the event, including the following: determining a service feedback instruction corresponding to the event by using the input control unit.

The implementing unit 303 invokes an accessibility function engine of a device that includes the application, and implements the accessibility function by using the accessibility function engine based on the service feedback instruction, including the following: invoking the accessibility function engine of the device that includes the application by using the input control unit, and implementing the accessibility function by using the accessibility function engine based on the service feedback instruction.

Beneficial effects obtained by applying the system implementations provided in the present application are the same as or similar to those obtained by applying the previous method implementations. To avoid repetition, details are omitted here for simplicity.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of other programmable data processing device generate an apparatus for implementing a specific function in one or more processes in the flowcharts and/or in one or more blocks in the block diagrams.

These computer program instructions can be stored in a computer readable memory that can instruct the computer or the other programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be used to store information accessible by the computing device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such a process, method, product or device. Without more constraints, an element preceded by "includes a . . . " does not preclude the existence of additional identical elements in the process, method, product or device that includes the element.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

As described herein, the present solution and description relates to implementations of an accessibility function in applications. In particular, examples of methods include receiving, by an application, a request for invoking an input control unit, and invoking the input control unit. When detecting an event corresponding to an accessibility function that is triggered by using the input control unit, a service feedback instruction corresponding to the event is determined. An accessibility function engine of a device that includes the application is invoked, and the accessibility function is implemented by using the accessibility function engine based on the service feedback instruction.

The proposed solution provides technical advantages, in that third-party application software does not need to be used in order to provide and implement accessibility functions. Further, the solution alleviates a problem, where, for example, security risks are caused to user information when third-party application software obtains operation information of a user in the application and information in a device interface.

Figure 4:
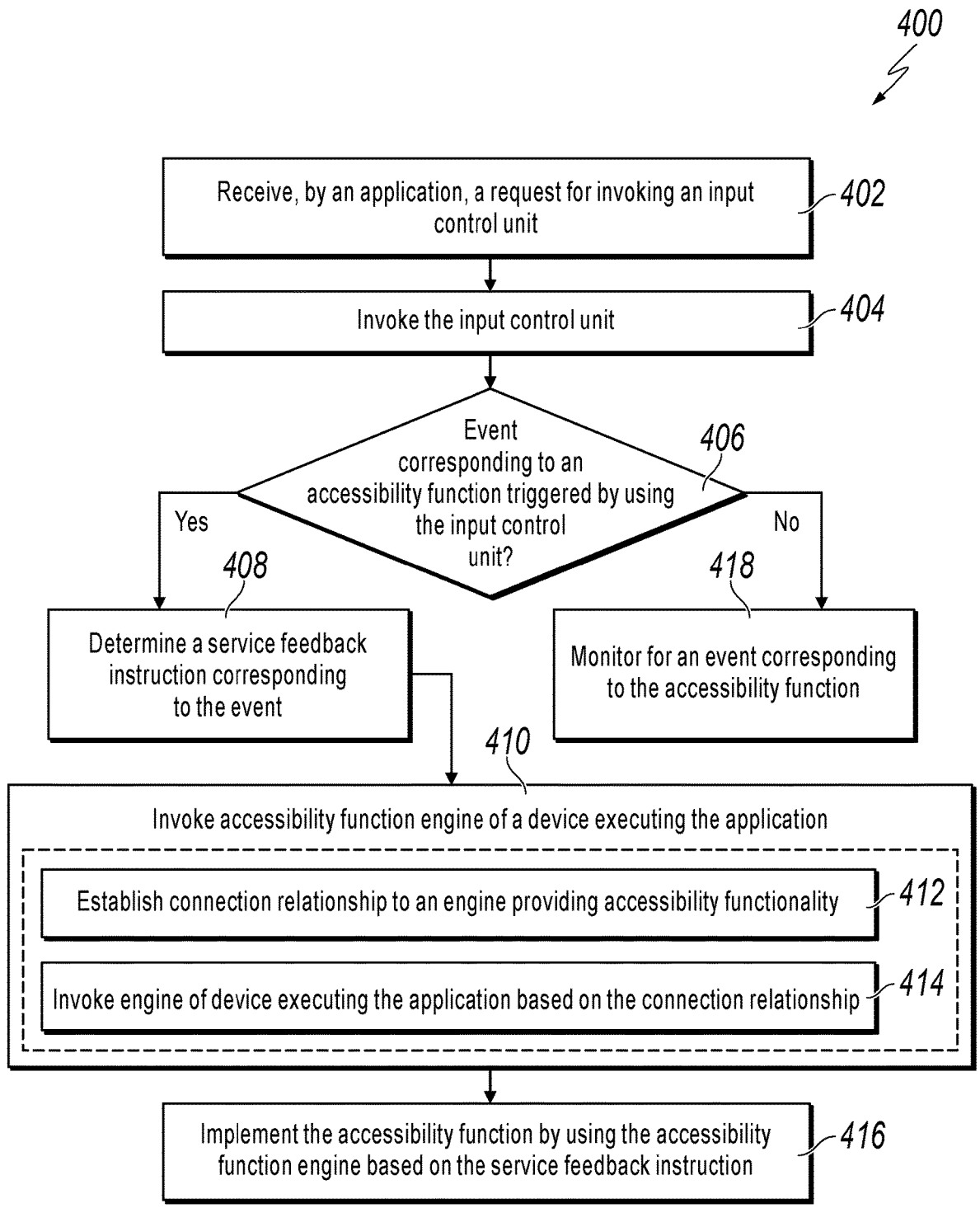
FIG. 4 is a flowchart illustrating an example of a computer-implemented method for implementing an accessibility function in applications, according to an implementation of the present disclosure.

FIG. 4 is a flowchart illustrating an example of a computer-implemented method 400 for implementing an accessibility function in applications, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, an application can receive a request for invoking an input control unit. The request can be sent by or can originate from a user interacting with an application installed in a particular device, such as a mobile phone or mobile computer. The request for invoking the input control unit can be triggered by a user tapping an input box in the application or an application interface, as well as by other predetermined operations or interactions. From 402, method 400 proceeds to 404.

At 404, the input control unit is invoked in response to the received request. The input control unit may be displayed within the current application interface by the application. In some instances, the input control unit may be an on-screen keyboard interface including one or more on-screen keys. In some instances, the input control unit may be configured in an operating system (e.g., as a default on-screen keyboard) or may be preconfigured by or for the application. From 404, method 400 proceeds to 406.

At 406, a determination is made as to whether an event corresponding to an accessibility function is triggered using the input control unit. If it is determined that an event corresponding to a particular accessibility function is triggered, method 400 proceeds to 408. Otherwise, if it is determined that an event corresponding to a particular accessibility function is not triggered, method 400 proceeds to 418, where, to save resources, the application does not need to perform an operation on the triggered event, and monitors for an event corresponding to the accessibility function in the future. In some instances, method 400 can proceed back to 406 to await an event being triggered that corresponds to an accessibility function.

The determination of 406 can be performed according to any suitable method or operation. In one example, an event triggered by using the input control unit is detected. A particular type of the triggered event is determined. Once the triggered event type is determined, a further determination is made as to whether the triggered event is the event corresponding to the accessibility function based on the event type of the triggered event. In one example, the event types corresponding to a predetermined accessibility function may include a "tap," "double tap," and "focus change" event. In response to detecting a "tap" event, a corresponding accessibility function can be determined. In response to some other event type being triggered (e.g., a "drag" event) that does not correspond to an accessibility function, then no particular accessibility function will be determined.

In a second example, the event types may be associated with or tied to particular operation objects presented in or in association with the input control unit. If the input control unit is an on-screen keyboard, for example, one or more operation objects may be presented as input buttons or interactive objects. Some of those objects may correspond to predetermined accessibility functions, such as an "a," "b," and "c" on the on-screen keyboard. In response to the application detecting that the "a" on the keyboard has been triggered or the operation object interacted with, then the corresponding accessibility function can be identified. From 406, method 400 proceeds to 408.

At 408, and in response to determining that the event corresponding to the accessibility function is triggered by using the input control unit, a service feedback instruction corresponding to the event is determined. Determining the service feedback instruction can be performed by any suitable method or operation. In one example, the method may include determining a service feedback instruction corresponding to a type of the event based on a predetermined mapping relationship between a type of an event corresponding to the accessibility function and each service feedback instruction.

For example, a mapping relationship may exist between the particular event types, such that the detected event type can determine which of the accessibility functions are to be performed, as well the particular service feedback instruction to be executed. In the "tap," "double tap," and "focus change" example above, a mapped combination between an event type "tap" and a service feedback instruction "performing text-to-speech on a tapped object" may be defined, such that when a particular object in an application interface is "tapped" by a user, the application determines that the service feedback instruction corresponding to the triggered event is "performing text-to-speech on the tapped object." From 408, method 400 proceeds to 410.

At 410, an accessibility function engine of a device executing the application is invoked. In some instances, invoking the accessibility function engine of a device that executes the application includes establishing a connection relationship to an engine that provides the accessibility function (as illustrated in 412). After the connection relationship is successfully established, the application can invoke the accessibility function engine based on the connected relationship at 414. Otherwise, the engine is not invoked.

In some instances, establishing the connection relationship can include causing the application to send a request to invoke an interface to the accessibility function engine. After the engine receives the request, the application can establish the connection and invoke the accessibility function engine. The accessibility function engine can be an open interface potentially, and can allow the application to invoke the interface after the application sends the request. In some instances, however, the accessibility function engine may be associated with particular permissions. When an application sends a request to invoke an interface to the accessibility function engine, the accessibility function engine may verify that the application, or a user of the application, has permission to invoke the interface. Once verification succeeds, then the application is allowed to invoke the interface. From 410, method 400 proceeds to 416, where the accessibility function is implemented by using the accessibility function engine based on the service feedback instruction.

The described solution herein allows the application to directly invoke an accessibility function engine of the device executing the application as opposed to prior solutions required any accessibility function requests to be sent to a third-party application or engine, which could result in potential security issues for user data. By directly bypassing the third-party application software, security risks can be reduced.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for implementing an accessibility function in current applications by bypassing third-party applications for reduced security risks, the method comprising:
    providing, by a third-party application installed on a device, an accessibility function;
    receiving, by a current application, a request for invoking an input control unit;
    invoking the input control unit;
    determining whether an event corresponding to the accessibility function is triggered by using the input control unit, wherein the accessibility function is provided by the third-party application;
    in response to determining that the event corresponding to the accessibility function is triggered by using the input control unit, determining a service feedback instruction corresponding to the event;
    bypassing the third-party application by invoking an accessibility function engine of the device, wherein the accessibility function engine bypasses an operating system of the device, wherein the operating system comprises a system accessibility manager and an accessibility service provided by the third-party application; and
    implementing the accessibility function by using the accessibility function engine based on the service feedback instruction.

2. The computer-implemented method of claim 1, wherein the input control unit is configured in the application.

3. The computer-implemented method of claim 1, wherein determining whether the event corresponding to an accessibility function is triggered by using the input control unit comprises:
    detecting, as a triggered event, an event triggered by using the input control unit;
    determining a type of the triggered event; and
    determining whether the triggered event is the event corresponding to the accessibility function based on the type of the triggered event.

4. The computer-implemented method of claim 3, wherein determining the service feedback instruction corresponding to the event comprises:
    determining a service feedback instruction corresponding to a type of the event based on a predetermined mapping relationship between a type of an event corresponding to the accessibility function and each service feedback instruction.

5. The computer-implemented method of claim 3, wherein the type of the triggered event comprises a tap, a double tap, or a focus change.

6. The computer-implemented method of claim 1, wherein invoking the accessibility function engine of a device comprises:
    establishing a connection relationship to an engine that provides the accessibility function; and
    invoking the accessibility function engine of the device that comprises the application based on the connection relationship.

7. The computer-implemented method of claim 1, wherein determining whether the event corresponding to the accessibility function is triggered by using the input control unit comprises:
    detecting an event corresponding to the accessibility function by using the input control unit.

8. The computer-implemented method of claim 7, wherein determining the service feedback instruction corresponding to the event comprises:
    determining a service feedback instruction corresponding to the event by using the input control unit.

9. The computer-implemented method of claim 8, wherein invoking the accessibility function engine of the device comprises:
    invoking the accessibility function engine of the device by using the input control unit.

10. The computer-implemented method of claim 1, wherein the input control unit is an on-screen keyboard.

11. The computer-implemented method of claim 10, wherein the accessibility function comprises a selection of a portion of the on-screen keyboard.

12. A non-transitory, computer-readable medium storing one or more instructions executable by a computer system to perform operations for implementing an accessibility function in current applications by bypassing third-party applications for reduced security risks, the method comprising:
    providing, by a third-party application installed on a device, an accessibility function;
    receiving, by current application, a request for invoking an input control unit;
    invoking the input control unit;
    determining whether an event corresponding to the accessibility function is triggered by using the input control unit, wherein the accessibility function is provided by the third-party application;
    in response to determining that the event corresponding to the accessibility function is triggered by using the input control unit, determining a service feedback instruction corresponding to the event;
    bypassing the third-party application by invoking an accessibility function engine of the device, wherein the accessibility function engine bypasses an operating system of the device, wherein the operating system comprises a system accessibility manager and an accessibility service provided by the third-party application; and
    implementing the accessibility function by using the accessibility function engine based on the service feedback instruction.

13. The non-transitory, computer-readable medium of claim 12, wherein the input control unit is configured in the application.

14. The non-transitory, computer-readable medium of claim 12, wherein determining whether the event corresponding to an accessibility function is triggered by using the input control unit comprises:
    detecting, as a triggered event, an event triggered by using the input control unit;
    determining a type of the triggered event; and
    determining whether the triggered event is the event corresponding to the accessibility function based on the type of the triggered event.

15. The non-transitory, computer-readable medium of claim 14, wherein determining the service feedback instruction corresponding to the event comprises:
    determining a service feedback instruction corresponding to a type of the event based on a predetermined mapping relationship between a type of an event corresponding to the accessibility function and each service feedback instruction.

16. The non-transitory, computer-readable medium of claim 14, wherein the type of the triggered event comprises a tap, a double tap, or a focus change.

17. The non-transitory, computer-readable medium of claim 12, wherein invoking the accessibility function engine of a device comprises:
   establishing a connection relationship to an engine that provides the accessibility function; and
   invoking the accessibility function engine of the device that comprises the application based on the connection relationship.

18. The non-transitory, computer-readable medium of claim 12, wherein:
   determining whether the event corresponding to the accessibility function is triggered by using the input control unit comprises detecting an event corresponding to the accessibility function by using the input control unit; and
   determining the service feedback instruction corresponding to the event comprises determining a service feedback instruction corresponding to the event by using the input control unit.

19. The non-transitory, computer-readable medium of claim 18, wherein invoking the accessibility function engine of the device comprises:
   invoking the accessibility function engine of the device by using the input control unit.

20. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations for implementing an accessibility function in current applications by bypassing third-party applications for reduced security risks, the method comprising:
   providing, by a third-party application installed on a device, an accessibility function;
   receiving, by a current application, a request for invoking an input control unit;
   invoking the input control unit;
   determining whether an event corresponding to the accessibility function is triggered by using the input control unit, wherein the accessibility function is provided by the third-party application;
   in response to determining that the event corresponding to the accessibility function is triggered by using the input control unit, determining a service feedback instruction corresponding to the event;
   bypassing the third-party application by invoking an accessibility function engine of lithe device, wherein the accessibility function engine bypasses an operating system of the device, wherein the operating system comprises a system accessibility manager and an accessibility service provided by the third-party application; and
   implementing the accessibility function by using the accessibility function engine based on the service feedback instruction.

* * * * *

UNITED STATES PATENT AND TRADEMARK OFFICE
CERTIFICATE OF CORRECTION

PATENT NO. : 10,664,160 B2
APPLICATION NO. : 16/378124
DATED : May 26, 2020
INVENTOR(S) : Yong Lou and Jiajia Li Page 1 of 1

It is certified that error appears in the above-identified patent and that said Letters Patent is hereby corrected as shown below:

In the Claims

In Column 16, Line 29, in Claim 12, after "by" insert -- a --.

In Column 18, Line 23, in Claim 20, delete "lithe" and insert -- the --, therefor.

Signed and Sealed this
Eleventh Day of August, 2020

Andrei Iancu
*Director of the United States Patent and Trademark Office*